US010489443B2

United States Patent
He et al.

(10) Patent No.: US 10,489,443 B2
(45) Date of Patent: Nov. 26, 2019

(54) METHOD AND APPARATUS OF DISPLAYING INFORMATION

(71) Applicant: Alibaba Group Holding Limited, Grand Cayman (KY)

(72) Inventors: Yihua He, Hangzhou (CN); Zhiqiang Zhang, Hangzhou (CN); Junpeng Ye, Hangzhou (CN); Lingling Ye, Hangzhou (CN); Yifei Zhang, Hangzhou (CN); Chunlei Duan, Hangzhou (CN); Hong Deng, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 113 days.

(21) Appl. No.: 14/603,278

(22) Filed: Jan. 22, 2015

(65) Prior Publication Data

US 2015/0205789 A1    Jul. 23, 2015

(30) Foreign Application Priority Data

Jan. 23, 2014    (CN) .......................... 2014 1 0032143

(51) Int. Cl.
*G06F 16/438*     (2019.01)
*G06F 16/951*     (2019.01)
*G06F 16/23*      (2019.01)

(52) U.S. Cl.
CPC ........ *G06F 16/438* (2019.01); *G06F 16/2365* (2019.01); *G06F 16/951* (2019.01)

(58) Field of Classification Search
CPC .... G06Q 30/0641; G06Q 50/01; G06Q 30/00; G06Q 20/10; G06F 17/3005; G06F 17/30371; G06F 17/30864
See application file for complete search history.

(56) References Cited

U.S. PATENT DOCUMENTS 5,351,276 A *   9/1994   Doll, Jr. ................ H04L 51/063
                                                       370/354
5,832,231 A *   11/1998  Raman ............. G06F 17/30017
                                                       709/234
(Continued)

FOREIGN PATENT DOCUMENTS

CN      101324941 A     12/2008
CN      101324950 A     12/2008
(Continued)

OTHER PUBLICATIONS

PCT Search Report and Written Opinion dated Apr. 15, 2015 for PCT Application No. PCT/US15/12531, 12 Pages.
(Continued)

*Primary Examiner* — William Spieler (57) ABSTRACT

The present disclosure discloses a method and an apparatus of displaying information in order to solve the problems of a monotonous way of displaying information and a low efficiency of human-machine interaction in existing technologies. The method determines transaction information exchanged between a first user and a second user, determines multimedia information to be displayed based on the determined transaction information for presentation to the second user. Since the disclosed method displays information in form of multimedia information, thus enriching and diversifying the information to be displayed. When transaction information is displayed in form of multimedia information to a second user, multimedia information to be displayed may be automatically matched and converted according to the determined transaction information without the need of a first user to add the multimedia information manually. Therefore the operating cost of the first user is effectively reduced and the efficiency of human-machine interaction is improved.

20 Claims, 4 Drawing Sheets

(56) References Cited

U.S. PATENT DOCUMENTS

| | | | |
|---|---|---|---|
| 6,332,133 B1 | 12/2001 | Takayama | |
| 6,748,375 B1 | 6/2004 | Wong et al. | |
| 7,184,526 B1 | 2/2007 | Cook | |
| 7,664,697 B2 | 2/2010 | Takayama | |
| 8,606,645 B1 | 12/2013 | Applefeld | |
| 8,676,921 B1 | 3/2014 | Kautto-Koivula et al. | |
| 9,317,835 B2* | 4/2016 | Calman | G06Q 10/10 |
| 2002/0147979 A1* | 10/2002 | Corson | H04N 7/173 |
| | | | 725/90 |
| 2002/0194121 A1 | 12/2002 | Takayama | |
| 2003/0002638 A1 | 1/2003 | Kaars | |
| 2004/0021584 A1* | 2/2004 | Hartz, Jr. | G06Q 10/10 |
| | | | 701/532 |
| 2005/0261987 A1* | 11/2005 | Bezos | G06Q 30/00 |
| | | | 705/26.44 |
| 2007/0136533 A1* | 6/2007 | Church | G06Q 30/0277 |
| | | | 711/137 |
| 2008/0004984 A1 | 1/2008 | Sendo et al. | |
| 2008/0040141 A1 | 2/2008 | Torrenegra et al. | |
| 2009/0082063 A1* | 3/2009 | Endo | H04M 1/72525 |
| | | | 455/558 |
| 2009/0228292 A1* | 9/2009 | Agnihotri | G06Q 30/02 |
| | | | 705/1.1 |
| 2010/0008479 A1 | 1/2010 | Cho et al. | |
| 2010/0121780 A1 | 5/2010 | Sheridan | |
| 2011/0060664 A1 | 3/2011 | Bezos et al. | |
| 2011/0153462 A1* | 6/2011 | Granich | G06Q 20/105 |
| | | | 705/27.1 |
| 2012/0226579 A1* | 9/2012 | Ha | G06Q 50/01 |
| | | | 705/26.35 |
| 2012/0233015 A1* | 9/2012 | Calman | G06Q 30/0633 |
| | | | 705/26.8 |
| 2013/0262165 A1 | 10/2013 | Gao | |
| 2014/0122310 A1* | 5/2014 | Torrens | G06Q 40/02 |
| | | | 705/35 |
| 2014/0143139 A1 | 5/2014 | Koplovitz et al. | |
| 2017/0243195 A1* | 8/2017 | Xing | G06Q 20/3278 |

FOREIGN PATENT DOCUMENTS

| | | |
|---|---|---|
| CN | 101459713 A | 6/2009 |
| CN | 102255827 A | 11/2011 |
| JP | 10-198739 A | 7/1998 |
| JP | H11-3348 A | 1/1999 |
| JP | 2010-211312 A | 9/2010 |
| JP | 2011-43939 A | 3/2011 |
| TW | 201340011 A | 10/2013 |
| TW | 201348152 A | 12/2013 |
| TW | 201349152 A | 12/2013 |
| WO | 2002/029757 A3 | 9/2003 |
| WO | 2013163103 A1 | 10/2013 |

OTHER PUBLICATIONS

International Preliminary Report on Patentability for Application No. PCT/US2015/012531, dated Jul. 26, 2016, 10 pages.
Office Action for Chinese Application No. 201410032143.0, dated Sep. 1, 2017 (with English Translation), 13 pages.
First Search dated Aug. 25, 2017, issued in related Chinese Application No. 201410032143.0 (1 page).
Second Search dated Apr. 25, 2018, issued in related Chinese Application No. 201410032143.0 (2 pages).
Second Office Action dated May 4, 2018, issued in related Chinese Application No. 201410032143.0 (13 pages).
Notifications of Reasons for Refusal dated Dec. 13, 2018, issued in related Japanese Application No. 2016-546085 (9 pages).
Taiwanese Office Action and Search Report for Taiwanese Application No. 103118602 dated Dec. 27, 2017 (10 pages).
Taiwanese Office Action and Search Report for Taiwanese Application No. 103118602 dated Jun. 22, 2018 (9 pages).
Taiwanese Office Action and Search Report for Taiwanese Application No. 107137403 dated Feb. 19, 2019 (10 pages).
Fourth Office Action for Chinese Application No. 201410032143.0 dated Feb. 28, 2019 with English machine translation (16 pages).
Third Office Action for Chinese Application No. 201410032143.0, dated Sep. 3, 2018, 16 pages.
Office Action for Korean Application No. 2016-7019007 dated Jun. 26, 2019 with partial English translation (10 pages).
Office Action for Taiwanese Application No. 107137403 dated Jun. 19, 2019 (10 pages).
Notice of Rejection dated Sep. 10, 2019, issued in related Japanese Application No. 2016-546085 (8 pages).
Hitoshi Okeya, "Over 100 million users! What is LINE?," Nikkei PC Beginners, vol. 4, No. 6, pp. 40-43, Nikkei Business Publications, Inc., Japan, Apr. 13, 2013 (7 pages).

* cited by examiner

METHOD AND APPARATUS OF DISPLAYING INFORMATION

CROSS REFERENCE TO RELATED PATENT APPLICATION

This application claims foreign priority to Chinese Patent Application No. 201410032143.0 filed on Jan. 23, 2014, entitled "Method and Apparatus of Displaying Information", which is hereby incorporated by reference in its entirety.

TECHNICAL FIELD

The present disclosure is related to a field of computer technologies, and more particularly, to methods and apparatuses of displaying information.

BACKGROUND

Recently, with the development of computer and network technologies, a user can easily conduct various interactive transactions via a network. For example, users can conduct interactive transactions such as instant messaging, shopping, making payment etc., via a network.

When a first user and a second user conduct an interactive transaction, the first user can send, via a client thereof, user information of the second user and interactive information that is interacted with the second user to a server. The server then sends the interactive information to a client of the second user according to user information of the second user.

In existing technologies, in order to enable the second user to know with whom a transaction is conducted and what the interactive transaction is, the server can send to the client of the second user client transaction information that includes the user information of the first user, type information of the interactive transaction and the interactive information for presentation.

However, in the existing technology, when the server provides the transaction information that is presented to the second user in the existing technologies, presentation is usually performed in a textual form only, so that a form of displaying information is too monotonous.

Although interactive information can contain multimedia information of a still picture and/or an animation (e.g. emoticons or animations) when a first user sends the interactive information to a second user via existing technologies, this needs the first user to manually add the picture and/or the animation into the interactive information, and thus the operating cost of the first user is relatively high and the efficiency of the human-machine interaction is relatively low.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method and an apparatus of displaying information that solves the problems of a monotonous way of displaying information and of a low efficiency of human-machine interaction in the existing technologies.

The embodiment of the present disclosure provides a method of displaying information comprises:
  determining transaction information exchanged between a first user and a second user;
  determining multimedia information that is to be displayed based on the determined transaction information; and
  displaying the determined multimedia information that is to be displayed to the second user.

The embodiment of the present disclosure provides an apparatus of displaying information comprises:
  a transaction information determination module to determine transaction information exchanged between a first user and a second user;
  a multimedia information determination module to determine multimedia information that is to be displayed based on the determined transaction information;
  a display module to display the determined multimedia information that is to be displayed to the second user.

The present disclosure provides a method and an apparatus of displaying information. The method determines transaction information that is exchanged between a first user and a second user, determines multimedia information that is to be displayed based on the determined transaction information, and displays the determined multimedia information that is to be displayed to the second user. Since the example method of the present disclosure displays information in the form of multimedia information, the way of displaying information is enriched, making the way of displaying information more diversified. When transaction information is displayed to a second user in the form of multimedia information, automatic matching or conversion of multimedia information to be displayed may be made based on the determined transaction information without the need of a first user to add the multimedia information manually, thus reducing the operating cost of the first user more efficiently and improving the efficiency of human-machine interaction.

BRIEF DESCRIPTION OF THE DRAWINGS

Accompanying drawings described herein provide a further understanding of the present disclosure and constitute a part of the present disclosure. Exemplary embodiments of the present disclosure and their descriptions are used for explaining the present disclosure and are not construed as limitations to the present disclosure. In the accompanying drawings.

DETAILED DESCRIPTION OF THE PREFERRED EMBODIMENTS

In order to enrich a form of displaying information, reduce an operating cost of a first user and improve efficiency of human-machine interaction, when the first user interacts with a second user, the disclosed method determines multimedia information to be displayed according to transaction information exchanged between the first user and the second user, and displays the determined multimedia information to the second user, i.e., displays the transaction information in form of the multimedia information to the second user.

In order to make the objectives, technical solutions and advantages of the present disclosure more clear, the present disclosure will be described in a clear and comprehensive manner in conjunction with specific embodiments and corresponding accompanied drawings. The embodiments described herein are only a part but not all of the embodiments of the present disclosure. According to the embodiments of the present disclosure, all other embodiments obtained by one of ordinary skill in the art without a creative effort should be included in the scope of protection of the present disclosure.

Figure 1:
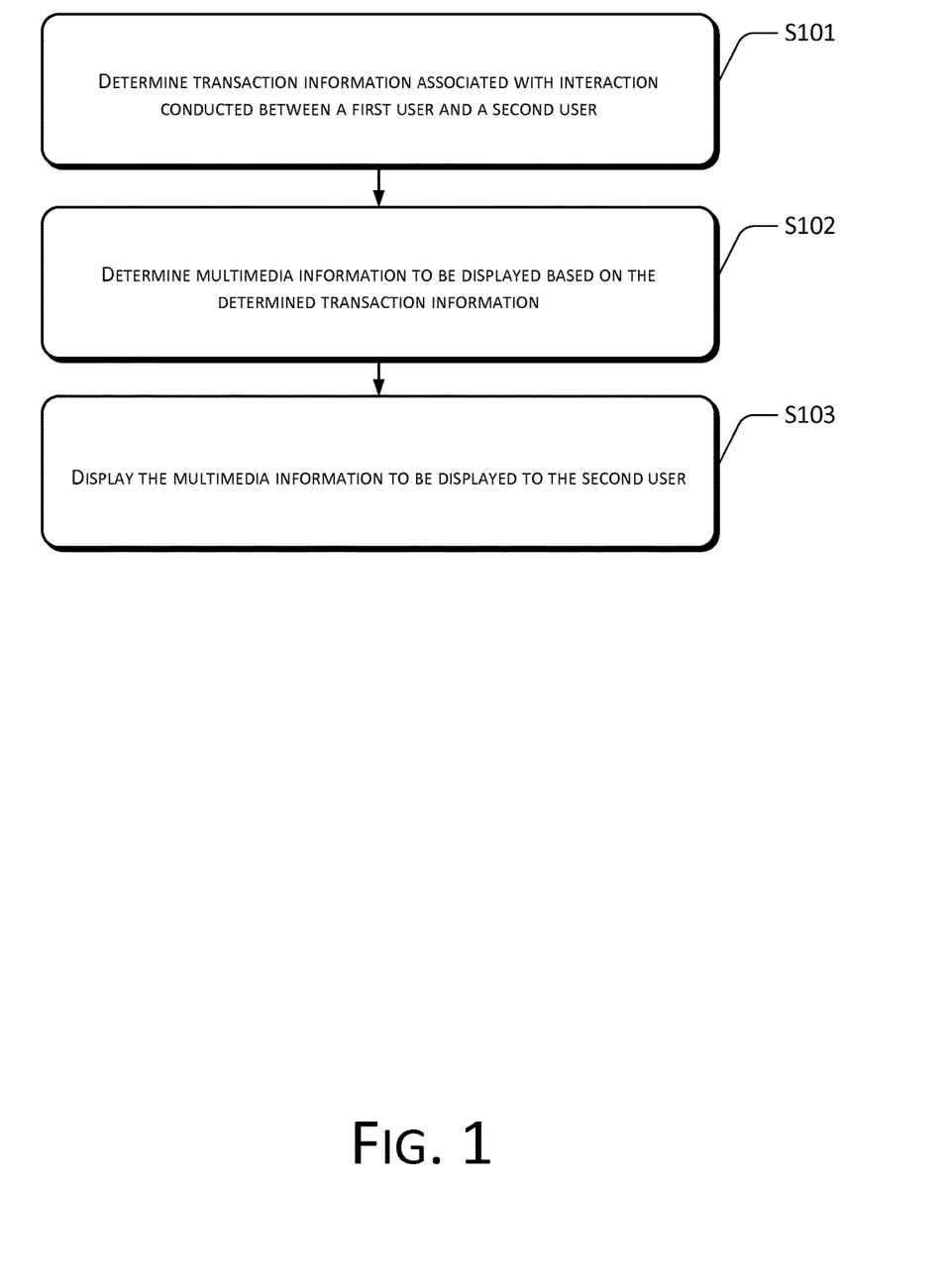
FIG. 1 is a process of displaying information according to an embodiment of the present disclosure.

FIG. 1 is a process of displaying information in an embodiment of the present disclosure, which includes the following:

S101 determines transaction information exchanged between a first user and a second user.

The transaction information described in the embodiment of the present disclosure comprises, but is not limited to, user information of the first user, user information of the second user, type information of an interactive transaction and interactive information exchanged between the first user and the second user, etc.

In an embodiment of the present disclosure, after a first user conducts transaction interactively with a second user, a server presents corresponding transaction information via a client terminal of the second user to the second user so as to provide information to the second user: who has performed what type of transaction with the second user and what interactive content is. The interactive transaction conducted between the first user and the second user includes, but is not limited to, an instant message, an account transfer etc. When a first user performs an account transfer with a second user, the first user is a payer, the second user is a payee. The transaction information to be displayed to the second user may include user information of the first user, user information of the second, an amount of fund transferred, remark information added by the first user, etc. Information including the amount of fund transferred and the remark information added by the first user corresponds to the interactive information. Moreover, the interactive information may further include other information exchanged between the first user and the second user.

A money transfer from a first user to a second user is used as an example herein for describing the embodiment of the present disclosure in detail.

When a first user performs a fund transfer to a second user, the first user may input information including user information of the second user, an amount of fund transfer and remark information (the first user may input any remark information according to needs or may not input remark information) via a fund transfer application (APP) of the first user. The fund transfer APP then generates and sends a transfer request that includes user information of the first user, the user information of the second user, the amount of fund transfer and the remark information to a server. The server determines the user information of the first user and the user information of the second user based on the transfer request, transfers the corresponding fund amount from the first user to the second user, and determines transaction information of this fund transfer, i.e., determines that the transaction information of the current fund transfer as a fund transferring transaction that transfers the corresponding fund amount from the first user to the second user with the remark information being remark information inputted by the first user.

The user information described in the embodiment of the present disclosure may contain an account, a nickname, and communication information of the user.

For example, a payer's user account is supposed to be AAA and a payee's user account is BBB. When the payer wants to transfer one hundred dollars to the payee, the payer first inputs the payee's user account BBB through the payer's fund transfer APP, and then inputs a fund transfer amount of one hundred dollars and remark information. The server transfers one hundred dollars from the user account AAA to the user account BBB accordingly, and determines transaction information of this fund transfer, with the determined transaction information as a fund transferring transaction of one hundred dollars from the user account AAA to the user account BBB and the user account AAA further adding corresponding remark information.

S102 determines multimedia information that is to be displayed based on the determined transaction information.

The multimedia information described in the embodiment of the present disclosure may include, but is not limited to, one or more of picture information, animation information, audio information and text information.

In an embodiment of the present disclosure, a plurality of pieces of multimedia information and a corresponding relationship between each piece of multimedia information and transaction information in a particular dimension may be set up in advance in the server. When a determination of multimedia information that is to be displayed is processed, multimedia information that corresponds to the transaction information is determined to be the multimedia information that is to be displayed based on the predetermined corresponding relationship. For example, a corresponding relationship between multimedia information and a specific keyword can be predetermined. When a determination of multimedia information to be displayed is processed, keyword(s) included in the interactive information of the transaction information is/are determined, and multimedia information corresponding to the determined keyword(s) is/are then determined as the multimedia information to be displayed.

The determined transaction information may further be converted into a piece of multimedia information, which is considered as the multimedia information to be displayed. For example, after the transaction information is determined, a text recognition technology is used to convert the transaction information into audio information, which is treated as the multimedia information to be displayed.

Moreover, in order to reduce consumption of network resources due to transmission of the multimedia information, multiple pieces of predetermined multimedia information may be stored in the client of the user, and an information identifier may be set up for each piece of multimedia information stored in the client. The server can perform a corresponding relationship between the information identifier of each piece of multimedia information and transaction information in a particular dimension. After the transaction information is determined at S101, the server determines an information identifier corresponding to the transaction information based on the corresponding relationship between the information identifier of each piece of multimedia information and the transaction information, and sets multimedia information corresponding to the determined information identifier to be the multimedia information to be displayed. For example, a corresponding relationship between an information identifier of multimedia information and a specific keyword can be set up in advance. When multimedia information to be displayed is determined, an information identifier corresponding to keyword(s) of the interactive information contained in the transaction information is/are determined, and multimedia information corresponding to the determined information identifier is set to be the multimedia information to be displayed. Similarly, the transaction information may alternatively be converted into the multimedia information by the client of the user.

S103 displays the multimedia information to be displayed to the second user.

If the predetermined multimedia information is stored in the server or the transaction information is converted into the multimedia information by the server, the server may send the determined multimedia information to be displayed to the client of the second user so that the client of the second user may display the received multimedia information. If the predetermined multimedia information is stored in the client of the user or the transaction information is converted into the multimedia information by the client of the user, upon determining the information identifier of the multimedia information to be displayed, the server may send the determined information identifier to the client of the second user to enable the client of the second user to display the multimedia information corresponding to the received information identifier.

By means of the method above, the transaction information is displayed to the second user in form of the multimedia information so that a form of displaying information can effectively be enriched and diversified. While the transaction information is displayed to the second user in form of the multimedia information, the server may automatically match or convert multimedia information to be displayed without the need of the first user to add the multimedia information manually based on the determined transaction information, thus effectively reducing the operating cost of first user and improving the efficiency of human-machine interaction.

Further, in consideration of a real application scenario, when the transaction information is displayed to the second user and if the displayed user information is an account or a nickname of the first user and not a real name or other names familiar with the second user, the second user may not be able to accurately recognize an identity of the first user after the second user views the transaction information. Accordingly, the second user may attempt to contact the first user through another means and determine the transaction conducted by the first user, thus wasting network resources that are consumed due to the second user contacting the first user through the other means.

Therefore, in order to save network resources that are consumed due to the second user contacting the first user through another means, when determining the multimedia information to be displayed based on the determined transaction information at S102 as shown in FIG. 1, the server may search an address book corresponding to the second user's user information according to the second user's user information contained in the determined transaction information, determines the first user's communication information from the first user's user information contained in the transaction information, search communication user information corresponding to the first user's communication information that is found in the address book, and converts the found communication user information into multimedia information which is treated as the multimedia information to be displayed.

Specifically, the second user may upload the second user's address book to the server in advance. In response to receiving the address book, the server builds and stores a corresponding relationship between the address book and the second user's user information. When determining the multimedia information to be displayed, the server may search the address book corresponding to the second user's user information according to the second user's user information contained in the transaction information as determined at S101, finds communication user information corresponding to the first user's communication information from the address book, and converts the found communication user information into the multimedia information. The first user's communication information in the embodiment of the present disclosure can comprise, but is not limited to, a mobile phone number, a landline telephone number, a mail address and an instant messaging account, etc., of the first user. The server stores communication information of each user in the user information in advance.

The fund transfer transaction in which a first user (the payer with the user account of AAA) transfers one hundred dollars to the second user (the payee user with the user account of BBB) is continued to be used as an example for illustration. When determining the multimedia information to be displayed, the server firstly searches an address book corresponding to the payee's user account BBB, with an address book that is found being an address book uploaded by the payee in advance. The server then determines the payer's communication information contained in the payer's user information. If the payer's communication information is the payer's mobile phone number, 12345678, the server determines that the payer's communication information is 12345678.

If the payer's real name is San Zhang, the payee generally stores communication information such as the payer's real name (i.e., San Zhang), San Zhang's mobile phone number 12345678, etc., in the payee's address book. Alternatively, another name (A Zhang) of San Zhang that is familiar with the payee and San Zhang's mobile phone number 12345678 are stored in the payee's address book. In other words, the communication user information with respect to the mobile phone number 12345678 is San Zhang (in real name) or A Zhang (in another name familiar with the payee) in the payee's address book. Therefore, after finding the payee's address book and determining the payer's communication information of 12345678, the server finds the communication user information of San Zhang or A Zhang corresponding to the communication information of 12345678 in the address book. If the payer's mobile phone number 12345678 in correspondence with the communication user information of San Zhang (in real name) are found from the address book of the payer, the server may convert the found communication user information of San Zhang into audio information (which is treated as the multimedia information to be displayed) based on text recognition technology, and send the multimedia information to be displayed to the payee's fund transferring APP according to S103 as shown in FIG. 1. The payee's fund transferring APP will play the audio information to the payee. In an embodiment, the amount of fund transfer may also be converted into audio information as the multimedia information to be displayed and played to the payee. For example, the audio information to be played is "San Zhang has transferred one hundred dollars into your account."

In an embodiment, if the multimedia information is converted by the client of the user, the server may send the communication user information directly sent to the client of the second user in response to finding the communication user information. The second user's client may then convert the received communication user information into multimedia information for display to the second user. Continuing the above example, the server sends communication user information of San Zhang or A Zhang that is found to the payee's fund transferring APP after finding the communication user information of San Zhang or A Zhang. The payee's fund transferring APP converts the received communication user information of San Zhang or A Zhang into audio information and plays the audio information.

Using the above method, the payee can accurately recognize the identity of the payer through the real name San Zhang or other familiar name A Zhang of the converted multimedia information, and therefore does not need to use the payer user's mobile phone number 12345678 to contact the payer for verifying the identify thereof, thus effectively saving network resources consumed by communications between the users.

In an embodiment, if the server does not find communication user information corresponding to the first user's communication information in the second user's address book, i.e., the second user's address book does not store the first user's communication information and corresponding user communication information, the server may still convert the first user's user information (which includes the first user's account number, nickname and communication information, etc.) that is contained in the transaction information determined at S101 and other information into multimedia information, treat this multimedia information as the multimedia information to be displayed, and displays the multimedia information to the second user, for example, "A user AAA transfers one hundred dollars to your account and communication information of the user AAA is 12345678". In an embodiment, the server may also send note information to the second user in form of textual information or audio information, such as "A user AAA transfers one hundred dollars to your account, and the user is not in your address book. So, please contact the user AAA using communication information of 12345678 and confirm this fund transfer. Or, if you confirm that the user AAA did not intend to conduct the fund transfer with you, please return the transferred fund amount to the user AAA through a third-party organization in order to avoid unnecessary disputes."

In an embodiment, for the first user, the first user may upload his/her address book to the server in advance. When the first user inputs the second user's user information, the server may search for communication user information corresponding to the second user's communication information in the first user's address book according to the second user's communication information contained in the second user's user information. If corresponding communication user information is found, the found communication user information may be displayed to the first user via the client used by the first user in form of textual information and/or audio information. If corresponding communication user information is not found, an indication in form of textual information and/or audio information may be made to the first user that the second user inputted by the first user is not listed in the address book. For example, an indication to a payer in an audio form is "an account BBB to which you want to transfer a fund is not listed in your address book. Please confirm a subject of the fund transfer before making this fund transfer, and be aware of a fraud."

Furthermore, interactive information of certain interactive transaction in a real application scenario may monetary amount of the transaction in addition to textual information exchanged between users. For example, transaction information of money transfer may include not only remark information inputted by a payer, but also a monetary amount of the money transfer, in which the monetary amount of the money transfer is a monetary amount associated with the transaction. Therefore, in order to indicate a transaction amount received by the second user in a more intuitive way, the embodiment of the present disclosure may further determine the multimedia information to be displayed based on how large the monetary amount associated with the transaction is. Specifically, a plurality of amount ranges, a plurality of pieces of multimedia information, and a corresponding relationship between each amount range and respective multimedia information are set up in the server in advance. When the multimedia information to be displayed is determined at S102, the server may determine an amount range to which a transaction monetary amount included in the interactive information that is contained in the transaction information belongs based on the amount ranges that are set up in advance, and determine multimedia information (which is rendered as the multimedia information to be displayed) corresponding to the amount range to which the transaction monetary amount belongs based on the pre-stored multimedia information and the preset corresponding relationship between each amount range and the respective multimedia information.

For example, for a money transfer transaction, amount ranges 1~50 dollars and 50~100 dollars are set up in the server in advance. Multimedia information corresponding to the 1~50 dollar amount arrange may be predetermined to be an animation of falling of a coin and a sound of the falling of the coin on a floor. Multimedia information for the 50~100 dollar amount arrange may be predetermined as an animation of falling of a large number of coins and a sound of the falling of that large number of coins on a floor. Accordingly, when an amount of money transfer made by a payer to a payee is one hundred dollars, the server determines that an amount of money transfer in interactive information that is included in transaction information is one hundred dollars at S101, and determines that an amount range to which the amount of money transfer of one hundred dollars belongs is the money amount range 50~100 dollars when multimedia information to be displayed is determined at S102. Therefore, the multimedia information to be displayed is determined as the animation of falling of the large number of coins and the sound of the falling of that large number of coins on the floor. Therefore, when the payee watches the animation or hears the sound, he/she can obtain an indication of the monetary amount involved in the transfer more intuitively.

In an embodiment, for a payer user, the server may display multimedia information corresponding to a predefined amount range where an amount of fund transfer is situated to the payer after the payer inputs that amount for the fund transfer.

In addition, if the second user's client has been set up with a plurality of pieces of multimedia information and an information identifier corresponding to each piece of multimedia information in advance, and the server has been set up with a corresponding relationship between each information identified and respective amount range, the server may determine an amount range to which an amount associated with a transaction that is included in interactive information contained in transaction information belongs in response to determining the transaction information, and determine an information identifier corresponding to the amount range to which the amount associated with the transaction belongs, and send the information identifier to the second user's client. The second user's client may then display multimedia information corresponding to the received information identifier.

In addition, in order to more intuitively indicate a degree of closeness between the first user and the second user to the second user, the embodiment of the present disclosure may also determine the multimedia information to be displayed based on a number of interactions between the first user and the second user. Specifically, a plurality of counting ranges, multiple pieces of multimedia information, and a correspondence relationship between each counting range and a respective piece of multimedia information are defined in the server in advance. When the multimedia information to be displayed is determined at S102, the server may search an interaction log including the first user's user information and the second user's user information based on the first user's user information and the second user's user information contained in the transaction information determined at S101, and determine a first number of times of interactions conducted between the first user and the second user within a first designated time interval based on historical interaction information recorded in the interaction log. Based on the predefined counting ranges, a counting range in which the first number of times is situated is determined. Based on the stored pieces of multimedia information and the correspondence relationship between each predefined counting range and the respective multimedia information, multimedia information corresponding to the counting range in which the first number of times is situated is determined and recognized as the multimedia information to be displayed. The first designated time period described above may be configured according to needs, such as set as past month or past three months.

As an example, the server may predefine counting ranges as fewer than three times and greater than 3 times respectively for fund transfer transaction, and predefine multimedia information for the counting range of fewer than three times to be a picture of smiling face, and multimedia information for the counting range of greater than three times to be an animation of face slapping respectively. When determining multimedia information to be displayed, the server may determine a first number of interactions from a payer to a payee in the last month based on an interaction log containing the payer's user information and the payee's user information. If the first number of times is determined to be fewer than three times, the picture of smiling face corresponding to the counting range of fewer than three times is determined to be the multimedia information to be displayed. If the first number of times is determined to be greater than three times, the animation of face slapping corresponding to the counting range of greater than three times is determined to be the multimedia information to be displayed.

In an embodiment, the client of the second user may store the predefined multimedia information. In this case, the server may determine an information identifier corresponding to the counting range in which the first number of times of interactions between the first user and the second user is situated, and send the information identifier to the second user's client end to enable the second user's client end to display the multimedia information corresponding to the received information identifier.

In an embodiment of the present disclosure, for interactive information including a transaction monetary amount of a certain interactive transaction (such as money transfer, shopping etc.), the multimedia information to be displayed may also be determined according to a ratio between the transaction monetary amount and the second user's balance. Specifically, multiple ratio ranges, multiple pieces of multimedia information and a correspondence relationship between each ratio range and a respective piece of multimedia information may be set up in the server in advance. When the multimedia information to be displayed is to be determined at S102, the server may determine interactive information that is contained in the transaction information determined at S101, and determine a ratio between a transaction amount contained in the interactive information and the second user's balance. Based on the ratio ranges that have been set up in advance, a ratio range to which the determined ratio belongs is determined. Multimedia information corresponding to the ratio range to which the ratio belongs may then be determined to be the multimedia information to be displayed based on pre-stored multimedia information and the correspondence relationship between each ratio range and the respective piece of multimedia information.

As an example, the server may predefined a ratio range of less than 50% and a ratio range of greater than 50% for fund transfer transactions, set multimedia information for the ratio range of less than 50% to be an animation of a rich man having a despise face and a voice of "just so little money", and multimedia information for the ratio range of greater than 50% to be an animation of a person seeing a big bag of coins falling from the sky and a voice of "a lot of money" respectively. When determining the multimedia information to be displayed, the server may determine a ratio range to which a ratio between a fund transfer amount and a payee's balance amount belongs. If the ratio range is determined to be less than 50%, the multimedia information to be displayed is determined to be the animation of the rich man having the despise face and the voice of "just so little money" that corresponds to the ratio range of less than 50%. If the determined ratio is greater than 50%, the multimedia information to be displayed is determined to be the animation of the person seeing the big bag of coins falling from the sky and the voice of "such a lot of money".

In an embodiment, the client of the second user may store the predefined multimedia information. The server determines an information identifier of the multimedia information to be displayed and sends the information identifier to the second user's client. The second user's client then displays the multimedia information corresponding to the received information identifier. The details thereof are not redundantly repeated herein.

In an embodiment, after the payer inputs the fund transfer amount, the server may present multimedia information corresponding to a ratio range to which that ratio belongs to the payer via the payer's fund transferring APP based on the ratio between the fund transfer amount and the payer's money balance. For example, for a payer, the server may set up a ratio range of less than 50% and a ratio range of greater than 50%, predefine multimedia information for the ratio range of less than 50% to be an animation showing a coin being taken away and multimedia information for the ratio range of greater than 50% to be an animation showing a big bag of coins being towed away. Accordingly, after the payer inputs an amount for fund transfer, the server may present, based on the ratio between fund transfer amount and the payer's money balance, multimedia information corresponding to a ratio range to which that ratio belongs to the payer via the payer's fund transferring APP.

Furthermore, in an embodiment of the present disclosure, the multimedia information to be displayed may be determined according to remark information inputted by the first user. Specifically, a plurality of keywords, multiple pieces of multimedia information, and a correspondence relationship between each keyword and a respective piece of multimedia information may be predetermined in the server in advance. When the multimedia information to be displayed is to be determined at S102, the server may determine the interactive information contained in the transaction information that is determined at S101, find a predetermined keyword from the remark information included in the interactive information, determine the multimedia information that corresponds to the keyword found in the remark information as the multimedia information to be displayed based on pre-stored multiple pieces of multimedia information and the predetermined correspondence relationship between each keyword and the respective piece of multimedia information. The remark information is inputted during interactions between the first user and the second user.

As an example, the server may predefine a keyword of "money back", and predetermine multimedia information corresponding to the keyword of "money back" to be audio information of "what goes around comes around". When determining multimedia information to be displayed, if the keyword of "money back" is found in remark information added by a payer, the audio information of "what goes around comes around" corresponding to that keyword of "money back" is determined as the multimedia information to be displayed.

For another example, for transactions associated with instant messaging, interactive information contained in transaction information corresponds to content exchanged between a first user and a second user, which is usually textual information. Therefore, the server may find a predetermined keyword directly from the interactive information, and determine multimedia information corresponding to the predetermined keyword as the multimedia information to be displayed.

In an embodiment, multiple pieces of predetermined multimedia information and corresponding information identifiers may be set up in the second user's client in advance, and the server may predetermine correspondence relationships between the information identifiers and keywords. The server determines an information identifier corresponding to a keyword contained in remark information, and sends the information identifier to the second user's client. Therefore, the second user's client displays multimedia information corresponding to the received information identifier. The details thereof are not redundantly repeated herein.

In an embodiment, after a payer inputs remark information, the server displays corresponding multimedia information to the payer via the payer's fund transferring APP based on a keyword contained in remark information that the payer inputs.

In addition, the embodiment of the present disclosure may further determine the multimedia information to be displayed based on the first user's user class. Specifically, a server may predetermine a plurality of class scopes, a plurality of pieces of multimedia information and a correspondence relationship between each class scope and a respective piece of multimedia information. When determining multimedia information to be displayed at S102, the server may determine a user class in user information of the first user which is contained in the transaction information, determine a class scope to which the user class belongs according to the predetermined class scopes, determine multimedia information that corresponds to a class scope to which the user class belongs as the multimedia information to be displayed based on stored pieces of multimedia information and the predetermined correspondence relationship between each class scope and the respective piece of multimedia information.

In an embodiment, after the first user inputs the second user's user information, the server displays, according to the class range to which the second user's user class belongs, the multimedia information corresponding to the class range via the first user's fund transferring APP. For example, for fund transfer transactions, when a payee's user class is high, the server may send audio information and/or textual information to prompt a payer with a message that "the credibility of payee is high, but we still recommend you to fully confirm the identity of the payee first before conducting the fund transfer in order to avoid unnecessary disputes". When a payee's user class is low, the server may send audio information and/or textual information to prompt a payer with a message that "the credibility of payee is low, please confirm the identity of the payee before transferring the fund to avoid fraud".

In an embodiment, multiple pieces of multimedia information and respective information identifiers may additionally or alternatively be set up in the second user's client in advance. The server may define a correspondence relationship between the information identifiers and respective class scopes. Accordingly, the server determines an information identifier corresponding to the class range to which the first user's user class belongs, and sends the information identifier to the second user's client. The second user's client displays a respective piece of multimedia information corresponding to the received information identifier. The details thereof are not redundantly repeated herein.

In an embodiment of the present disclosure, the server may further determine a social relationship between the first user and the second user based on the first user's user information, the second user's user information and a second counting number which indicates a number of times of interactions between the first user and the second user during a second designated time period, and determine the multimedia information to be displayed according to that social relationship. Specifically, the server may set up a plurality of social relationship, a plurality of pieces of multimedia information and correspondence relationships between the social relationships and the multiple pieces of multimedia information. When determining the multimedia information to be displayed at S102, the server may search an interaction log in which the first user's user information and the second user's user information are included based on the first user's user information and the second user's user information contained in the transaction information, determine a second number of times of interactions between the first user and the second user during a second designated time period based on historical interaction information recorded in the interactive log, determine a social relationship between the first user and the second user based on the first user's user information, the second user's user information and the determined second number of times, determine multimedia information that corresponds to the social relationship between the first user and the second user to be the multimedia information to be displayed based on stored pieces of multimedia information and the correspondence relationships between the social relationships and the multiple pieces of multimedia information. The second designated time period may be configured according to a need, such as past six months or past year.

For example, respective social relationships of friends, classmates and colleagues, and respective pieces of multimedia information corresponding to these three social relationships may be set up in advance. Thereafter, the multimedia information to be displayed is determined based on the determined social relationship between the first user and the second user.

When the social relationship between the first user and the second user is determined based on predetermined social relationships (such as friends, classmates and colleagues in the above example), a probability that the first user and the second user belong to each social relationship is determined by applying a predetermined algorithm based on the second number of times of interactions between the first user and the second user during the second designated time period, and a social relationship having the largest probability is selected as the social relationship between the first user and the second user.

The above description merely shows an illustrative example for explaining the method of determining a social relationship between a first user and a second user. Other methods may also be used, and the details thereof are described one by one herein.

The above shows the method for displaying multimedia information to a second user and/or a first user based on seven dimensions of information that are uploaded in advance by the second user and/or the first user, including an address book, a transaction monetary amount, a first number of times of interactions in a designated time period, a ratio between the transaction monetary amount and a money balance of a respective party, a keyword contained in remark information, respective user classes of the first user and the first user, and a social relationship between the first user and the first user. The method of displaying multimedia information may employ one or more of these seven dimensions of information.

The above shows the method of displaying information in the present disclosure. Based on a same concept, the present disclosure further provides an apparatus of displaying information as shown in FIG. 2.

Figure 2:
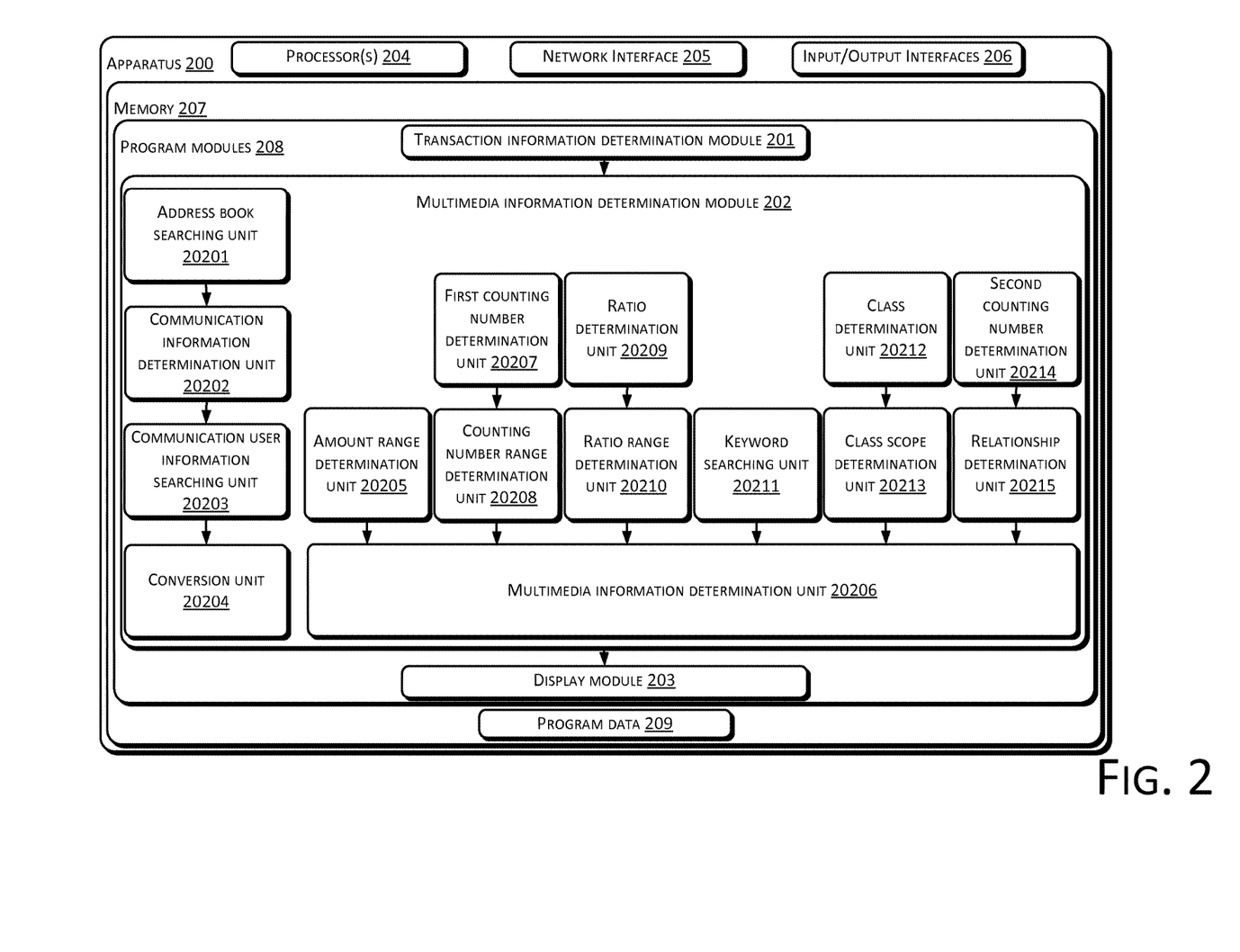
FIG. 2 is a structural diagram illustrating an apparatus of displaying information according to an embodiment of the present disclosure.

FIG. 2 is a structural diagram illustrating an apparatus 200 of displaying information according to an embodiment of the present disclosure, which includes:

a transaction information determination module 201 to determine transaction information exchanged between a first user and a second user;

a multimedia information determination module 202 to determine multimedia information that is to be displayed based on the determined transaction information;

a display module 203 to display the determined multimedia information that is to be displayed to the second user.

The multimedia information determination module 202 includes:

an address book searching unit 20201 to search, according to the second user's user information contained in the determined transaction information, an address book corresponding to the second user's user information, the address book being uploaded by the second user in advance;

a communication information determination unit 20202 to determine the first user's communication information based on the first user's user information contained in the transaction information;

a communication user information searching unit 20203 to search communication user information corresponding to the first user's communication information in the address book; and a conversion unit 20204 to convert found communication user information into multimedia information as the multimedia information to be displayed.

The multimedia information determination module 202 may also include:

an amount range determination unit 20205 to determine, according to each predetermined amount range, an amount range to which a transaction monetary amount included in interactive information contained in the transaction information belongs; and a multimedia information determination unit 20206 to determine multimedia information that corresponds to the amount range to which the transaction monetary amount belongs as the multimedia information to be displayed based on each pre-stored piece of multimedia information and a correspondence relationship between each predetermined amount range and a respective piece of multimedia information.

The multimedia information determination module 202 may also include:

a first counting number determination unit 20207 to search an interaction log comprising the first user's user information and the second user's user information based on the first user's user information and the second user's user information contained in the transaction information, determine a first number of times of interactions between the first user and the second user during a first designated time period based on historical interaction information recorded in the interaction log;

a counting number range determination unit 20208 to determine a number range to which the first number of times belongs based on predetermined number ranges; and the multimedia information determination unit 20206 to determine multiple information that corresponds the a number range to which the first number of times belongs as the multimedia information to be displayed based on pre-stored pieces of multimedia information and correspondence relationships between the predetermined number ranges and respective pieces of multimedia information.

The multimedia information determination module 202 may also include:

a ratio determination unit 20209 to determine the interactive information contained in the transaction information and determine a ratio between the transaction monetary amount contained in the interactive information and the second user's monetary balance amount;

a ratio range determination unit 20210 to determine a ratio range to which the determined ratio belongs based on predetermined ratio ranges; and the multimedia information determination unit 20206 to determine, according to pre-stored pieces of multimedia information and correspondence relationships between predetermined ratio ranges and respective pieces of multimedia information, multimedia information that corresponds to the ratio range to which the determined ratio belongs as the multimedia information to be displayed.

The multimedia information determination module 202 includes:

a keyword searching unit 20211 to determine the interactive information contained in the transaction information, search for a predetermined keyword from remark information contained in the interactive information, the remark information being inputted during interactions between the first user and the second user; and a multimedia information determination unit 20206 to determine multimedia information that corresponds to a keyword found in the remark information as the multimedia information to be displayed based on pre-stored pieces of multimedia information and a correspondence relationship between each predetermined keyword and a respective piece of multimedia information.

The multimedia information determination module 202 includes:

a class determination unit 20212 to determine a user class in the first user's user information contained in the transaction information;

a class scope determination unit 20213 to determine a class range within which the user class belongs based on predetermined class scopes; and a multimedia information determination unit 20206 to determine multimedia information that corresponds to the class scope to which the user class belongs as the multimedia information to be displayed based on pre-stored pieces of multimedia information and correspondence relationships between the predetermined class scopes and respective pieces of multimedia information.

The multimedia information determination module 202 may also include:

a second counting number determination unit 20214 to search an interaction log which includes the first user's user information and the second user's user information based on the first user's user information and the second user's user information contained in the transaction information, determine a second number of times of interactions between the first user and the second user within a second designated time period based on historical interaction information recorded in the interaction log;

a relationship determination unit 20215 to determine a social relationship between the first user and the second user based on the first user's user information, the second user's user information and the determined second number of times; and the multimedia information determination unit 20206 to determine multimedia information that corresponds to the social relationship between the first user and the second user as the multimedia information to be displayed based on pre-stored pieces of multimedia information and correspondence relationships between social relationships and respective pieces of multimedia information.

The multimedia information includes at least one of picture information, animation information, audio information and text information.

In a typical configuration, the apparatus 200 may include one or more computing devices. In an embodiment, the apparatus 200 may include one or more processors (CPU) 204, input/output interfaces 205, a network interface 206 and memory 207. The memory 206 may include program modules 208 and program data 209. The program modules 208 include one or more modules and/or units as described in the foregoing embodiments.

The memory 207 may include a form of computer readable media, e.g., a non-permanent storage device, random-access memory (RAM) and/or a nonvolatile internal storage, such as read-only memory (ROM) or flash RAM. The memory 207 is an example of computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the apparatus as shown in FIG. 2 may be located in a server.

FIG. 2 shows an example of a server storing predetermined pieces of multimedia information in advance for illustration. When the server pre-stores the predetermined pieces of multimedia information, an information interactive system, which includes a client of a first user, the server, and a client of a second user, is shown in FIG. 3.

Figure 3:
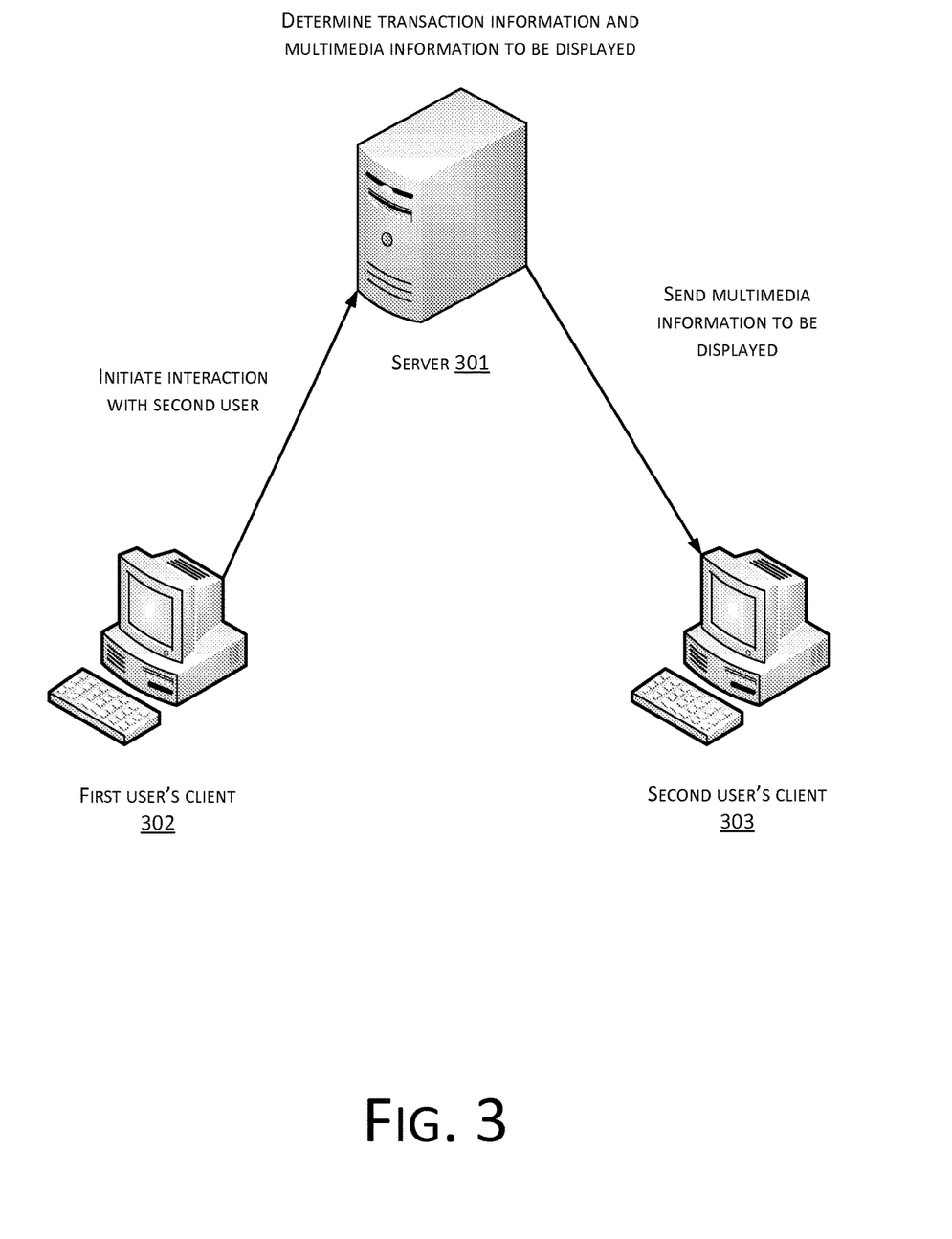
FIG. 3 is a schematic diagram illustrating an information interactive system when various pieces of predetermined multimedia information are stored in a server according to an embodiment of the present disclosure.

FIG. 3 is a schematic diagram illustrating an information interactive system in which a server 301 stores predetermined pieces of multimedia information in accordance with an embodiment of the present disclosure. In FIG. 3, after a first user initializes an interaction with a second user via the first user's client 302, a server determines transaction information of this interaction, determines multimedia information to be displayed according to the transaction information, and sends the multimedia information to be displayed to the second user's client 303 for display.

In an embodiment, the predetermined pieces of multimedia information may alternatively be stored in the second user's client. In this case, an information interactive system is shown in FIG. 4.

Figure 4:
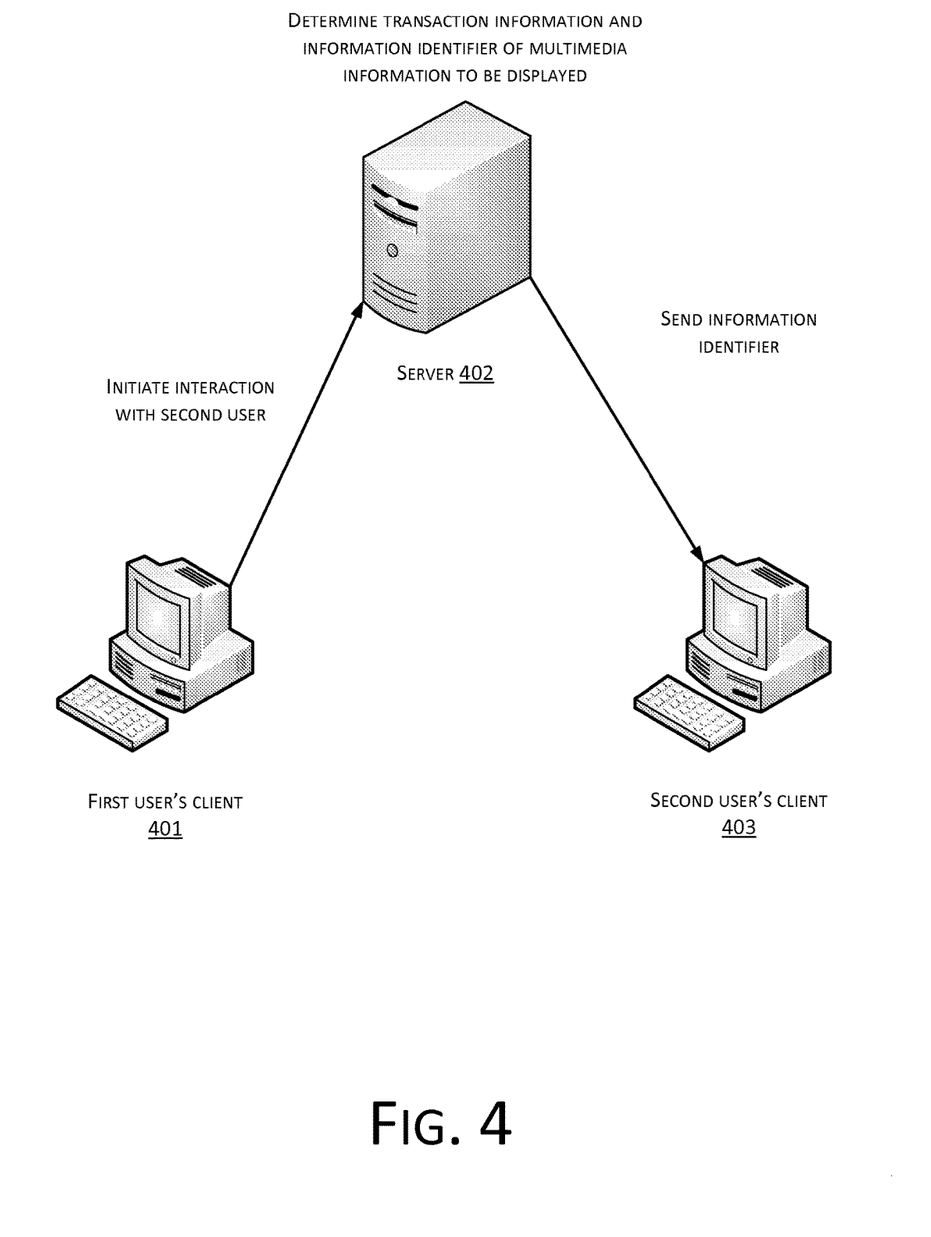
FIG. 4 is a schematic diagram illustrating an information interactive system when various pieces of predetermined multimedia information are stored in a client according to an embodiment of the present disclosure.

FIG. 4 is a schematic diagram illustrating an information interactive system when a client stores predetermined pieces of multimedia information in accordance with an embodiment of the present disclosure. In FIG. 4, after a first user initializes an interaction with a second user via the first user's client 401, a server 402 determines transaction information associated with this interaction, determines an information identifier of multimedia information to be displayed according to the transaction information, and sends the determined information identifier to the second user's client 403. Accordingly, the second user's client 403 displays the multimedia information corresponding to the received information identifier.

The present disclosure provides a method and an apparatus of displaying information. The method determines transaction information exchanged between a first user and a second user, determines multimedia information to be displayed based on the determined transaction information for presentation to the second user. Since the disclosed method displays information in form of multimedia information, thus enriching and diversifying the information to be displayed. When transaction information is displayed in form of multimedia information to a second user, multimedia information to be displayed may be automatically matched and converted according to the determined transaction information without the need of a first user to add the multimedia information manually. Therefore the operating cost of the first user is effectively reduced and the efficiency of human-machine interaction is improved.

It should be noted that the terms "comprise", "include" or any other variations thereof are meant to cover the non-exclusive inclusions. The process, method, product or apparatus that includes a series of elements not only includes those elements, but also includes other elements that are not explicitly listed, or further includes elements that already existed in such process, method, product or apparatus. In a condition without further limitations, an element defined by the phrase "include one . . . " does not exclude any other similar elements from existing in the process, method, product or apparatus.

A person with ordinary skill in the art should understand that the embodiments of the present disclosure can be provided as a method, a system or a product of a computer program. Therefore, the present disclosure can be implemented as an embodiment of only hardware, an embodiment of only software or an embodiment of a combination of hardware and software. Moreover, the present disclosure can be implemented as a product of a computer program that can be stored in one or more computer readable storage media (which includes but is not limited to, a magnetic disk, a CD-ROM or an optical disk, etc.) that store computer-executable instructions.

The above merely describes the embodiments of the present disclosure, which are not intended to limit the scope of the present disclosure. Various modifications and alternations can be made to the present disclosure by a person with ordinary skill in the art. Any modifications, replacements and improvements within the scope of the spirit and principle of the present disclosure should fall within the scope of the claims of the present disclosure.

What is claimed is:

1. A method implemented by a server, the method comprising:
   determining, by one or more processors of the server, transaction information associated with an interaction performed by a first user and directed towards a second user, the interaction including a fund transfer of a transaction amount from a first account of the first user to a second account of the second user;
   automatically determining, by the one or more processors of the server, multimedia information based on the transaction information, the multimedia information including a conversion of the transaction information into a multimedia form, the multimedia form including a visual portion and an audible portion, wherein the multimedia information is determined based on a ratio between the transaction amount and a balance amount of the second account;
   determining, by the one or more processors of the server, an information identifier of the multimedia information, the information identifier of the multimedia information having a smaller size than the multimedia information; and
   transmitting, through a network interface of the server, the information identifier to a client of the second user, transmission of the information identifier to the client of the second user consuming less network resource than transmission of the multimedia information to the client of the second user, wherein the client of the second user is configured to visually and audibly present multimedia information that is stored in the client of the second user and corresponds to the information identifier.

2. The method as recited in claim 1, wherein determining the multimedia information based on the transaction information further comprises:
   searching an address book corresponding to user information of the second user based on the user information of the second user included in the transaction information, the address book being uploaded in advance by the second user;
   determining communication information of the first user based on user information of the first user included in the transaction information;
   searching communication user information corresponding to the communication information of the first user in the address book; and
   converting the found communication user information into the multimedia information.

3. The method as recited in claim 1, wherein determining the multimedia information based on the transaction information further comprises:
   determining an amount range to which the transaction amount included in interactive information of the transaction information belongs based on predetermined amount ranges; and
   selecting a pre-stored piece of multimedia information as part of the multimedia information based on the amount range and correspondence relationships between pre-stored pieces of multimedia information and the predetermined amount ranges.

4. The method as recited claim 1, wherein determining the multimedia information based on the transaction information further comprises:
   searching an interaction log that includes user information of the first user and user information of the second user based on the user information of the first user and the user information of the second user included in the transaction information;
   determining a first number of times of interactions between the first user and the second user within a first designated time period based on historical interaction information recorded in the interaction log;
   determining a number range to which the first number of times belongs based on predetermined number ranges; and
   selecting a given pre-stored piece of multimedia information as part of the multimedia information based on the number range and correspondence relationships between pre-stored pieces of multimedia information and the predetermined number ranges.

5. The method as recited in claim 1, further comprising:
   automatically determining another multimedia information based on the transaction information, the other multimedia information including conversion of the transaction information in the multimedia form, wherein the other multimedia information is determined based on a ratio between the transaction amount and a balance amount of the first account; and
   presenting the other multimedia information to the first user.

6. The method as recited claim 1, wherein determining the multimedia information based on the transaction information further comprises:
   determining interactive information contained in the transaction information and searching a predetermined keyword from remark information contained in the interactive information, the remark information being inputted by the first user when interacting with the second user; and
   converting a keyword found in the remark information into the multimedia information based on pre-stored pieces of multimedia information and correspondence relationships between predetermined keywords and respective pieces of multimedia information.

7. The method as recited claim 1, wherein determining the multimedia information based on the transaction information further comprises:
   determining a user class in user information of the first user which is contained in the transaction information;
   determining a class scope to which the user class belongs based on predetermined class scopes, the class scope indicating credibility of the first user; and
   selecting a pre-stored piece of multimedia information as part of the multimedia information based on the class scope and correspondence relationships between pre-stored pieces of multimedia information and the predetermined class scopes.

8. The method as recited in claim 1, wherein determining the multimedia information based on the transaction information further comprises:
   searching an interaction log which includes the first user's user information and the second user's user information based on the first user's user information and the second user's user information contained in the transaction information;
   determining a second number of times of interactions between the first user and the second user within a second designated time period based on historical interaction information recorded in the interaction log;
   determining a social corresponding relationship between the first user and the second user based on the first user's user information, the second user's user information and the determined second number of times; and
   selecting a pre-stored piece of multimedia information as part of the multimedia information based on the social corresponding relationship between the first user and the second user and correspondence relationships between pre-stored pieces of multimedia information and social relationships.

9. The method as recited in claim 1, wherein the multimedia information is determined further based on (1) the transaction amount being transferred into the second account, and (2) a ratio range to which the ratio between the transaction amount and the balance amount of the second account belongs such that for a given ratio range to which the ratio belongs, a given multimedia information is determined based on a corresponding relationship between the given ratio range and the given multimedia information.

10. The method as recited in claim 1, further comprising:
    searching an address book of the first user for communication user information of the second user;
    responsive to finding the communication user information of the second user in the address book of the first user, converting the communication user information of the second user into the multimedia information; and
    responsive to not finding the communication user information of the second user in the address book of the first user, generating an alert to the first user.

11. The method as recited in claim 10, wherein the alert requests the first user to confirm the second user as a subject of the fund transfer prior to making the fund transfer.

12. The method as recited in claim 1, further comprising:
    searching an address book of the second user for communication user information of the first user;
    responsive to finding the communication user information of the first user in the address book of the second user, converting the communication user information of the first user into the multimedia information; and
    responsive to not finding the communication user information of the first user in the address book of the second user, generating an alert to the second user.

13. The method as recited in claim 12, wherein the alert requests the second user to confirm the fund transfer from the first user or return the transaction amount to the first account.

14. An information displaying apparatus comprising:
    one or more processors;
    memory;
    a network interface;
    a transaction information determination module stored in the memory and executable by the one or more processors to determine transaction information associated with an interaction performed by a first user and directed towards a second user, the interaction including a fund transfer of a transaction amount from a first account of the first user to a second account of the second user;
    a multimedia information determination module stored in the memory and executable by the one or more processors to automatically determine (1) multimedia information based on the transaction information, the multimedia information including a conversion of the transaction information into a multimedia form, the multimedia form including a visual portion and an audible portion, wherein the multimedia information is determined based on a ratio between the transaction amount and a balance amount of the second account, and (2) an information identifier of the multimedia information, the information identifier of the multimedia information having a smaller size than the multimedia information; and
    a display module stored in the memory and executable by the one or more processors to transmit, through the network interface of the server, the information identifier to a client of the second user, transmission of the information identifier to the client of the second user consuming less network resource than transmission of the multimedia information to the client of the second user, wherein the client of the second user is configured to visually and audibly present multimedia information that is stored in the client of the second user and corresponds to the information identifier.

15. The apparatus as recited in claim 14, wherein the multimedia information determination module comprises:
    an address book searching unit to search, according to the second user's user information contained in the transaction information, an address book corresponding to the second user's user information, the address book being uploaded by the second user in advance;
    a communication information determination unit to determine the first user's communication information based on the first user's user information contained in the transaction information;
    a communication user information searching unit to search the first user's communication user information corresponding to the first user's communication information in the address book; and
    a conversion unit to convert the found first user's communication user information into the multimedia information.

16. The apparatus as recited in claim 14, wherein the multimedia information determination module comprises:
    an amount range determination unit to determine an amount range to which the transaction amount included in interactive information contained in the transaction information belongs based on predetermined amount ranges; and a multimedia information determination unit to select a pre-stored piece of multimedia information as part of the multimedia information based on the amount range and correspondence relationships between pre-stored pieces of multimedia information and the predetermined amount ranges.

17. The apparatus as recited in claim 14, wherein the multimedia information determination module comprises:
a first counting number determination unit to search an interaction log comprising the first user's user information and the second user's user information based on the first user's user information and the second user's user information contained in the transaction information, determine a first number of times of interactions between the first user and the second user during a first designated time period based on historical interaction information recorded in the interaction log;
a counting number range determination unit to determine a number range to which the first number of times belongs based on predetermined number ranges; and
a multimedia information determination unit to select a given pre-stored piece of multimedia information as part of the multimedia information based on the number range and correspondence relationships between pre-stored pieces of multimedia information and the predetermined number ranges.

18. The apparatus as recited in claim 14, wherein:
the multimedia information determination module is further executable by the one or more processors to automatically determine another multimedia information based on the transaction information, the other multimedia information including conversion of the transaction information in the multimedia form, wherein the other multimedia information is determined based on a ratio between the transaction amount and a balance amount of the first account; and
the display module is further executable by the one or more processors to present the other multimedia information to the first user.

19. The apparatus as recited in claim 14, wherein the multimedia information determination module comprises:
a keyword searching unit to determine the interactive information contained in the transaction information, search for a predetermined keyword from remark information contained in the interactive information, the remark information being inputted during interactions between the first user and the second user; and
a multimedia information determination unit to convert a keyword found in the remark information into the multimedia information based on pre-stored pieces of multimedia information and a correspondence relationship between each predetermined keyword and a respective piece of multimedia information.

20. The apparatus as recited in claim 14, wherein the multimedia information determination module comprises:
a class determination unit to determine a user class in the first user's user information contained in the transaction information;
a class scope determination unit to determine a class scope to which the user class belongs based on predetermined class scopes, the class scope indicating credibility of the first user; and
a multimedia information determination unit to select a pre-stored piece of multimedia information as part of the multimedia information based on the class scope and correspondence relationships between pre-stored pieces of multimedia information and the predetermined class scopes.

* * * * *